United States Patent [19]

McGavin

[11] 4,412,462
[45] Nov. 1, 1983

[54] DRILL ADJUSTING TOOL

[75] Inventor: Hubert P. McGavin, Binghamton, N.Y.

[73] Assignee: The Singer Company, Binghamton, N.Y.

[21] Appl. No.: 330,296

[22] Filed: Dec. 14, 1981

[51] Int. Cl.³ ............................................... B21K 5/06
[52] U.S. Cl. ...................................... 76/5 R; 72/317; 33/178 B
[58] Field of Search .............. 76/5 R, 5 B; 33/178 B, 33/178 R; 72/370, 36, 317, 462, 464; 29/275, 255, 229, 234, 283, 407

[56] References Cited

U.S. PATENT DOCUMENTS

| | | | |
|---|---|---|---|
| 1,232,235 | 7/1917 | Davies | 76/5 B |
| 1,388,437 | 8/1921 | Nell | 76/5 B |
| 1,502,648 | 7/1924 | Smith | 76/5 B |
| 2,121,817 | 6/1938 | Nast | 76/5 B |
| 2,350,415 | 6/1944 | Paulsen | 33/178 B |
| 2,364,129 | 12/1944 | Catlin et al. | 33/178 R |
| 2,509,932 | 5/1950 | Leeth | 29/283 |
| 2,580,412 | 1/1952 | Darmody | 33/178 B |

FOREIGN PATENT DOCUMENTS

| | | | |
|---|---|---|---|
| 646348 | 7/1928 | France | 76/5 R |

*Primary Examiner*—Roscoe V. Parker
*Attorney, Agent, or Firm*—Douglas M. Clarkson; Jeff Rothenburg

[57] ABSTRACT

The disclosure describes a core drill adjusting tool formed of a base plate of a predetermined size and thickness with a plurality of recesses of different diameters for testing a core drill and a frustum affixed thereto over which the cutting surfaces can be spread, an amount indicated by the testing recesses, by applying the cutting surfaces forcefully over the frustum.

5 Claims, 5 Drawing Figures

DRILL ADJUSTING TOOL

BACKGROUND OF THE INVENTION

The present invention, generally, relates to an adjusting tool for a core drill and, more particularly, to a tool to adjust the position of the cutting edges of a drill that have become out of tolerance through use.

In the past, a core drill that no longer cuts a hole of a required diameter, because either the drill has worn down in diameter or has become deformed and misshaped, had to be discarded and scraped even though there may be considerable life remaining in the cutting edges. This problem, of course, has existed for a substantial period of time, and there is presently available machines, hydraulically operated devices and other complicated equipment for the expressed purpose of adjusting the position of the cutting edges of such drills.

However, such prior machinery are excessively expensive, frequently costing more than the tools which they are designed to adjust. Moreover, such prior machinery are excessively complicated and frequently become inoperative due to a need for a simple oil change or other repair and/or adjustment.

The following are examples of such well known prior art:

| | | |
|---|---|---|
| 1,232,235 | Davies | July 3, 1917 |
| 1,388,437 | Nell | August 23, 1921 |
| 1,502,648 | Smith | July 22, 1924 |
| 2,121,817 | Nast | June 28, 1938 |

The prior art serves to emphasize the length of time the problem has existed, even with the great number of attempts at providing a solution. The distinctions and several advantages of the present invention over such prior art will become apparent as the description proceeds.

INVENTION SUMMARY

It is an important object of the invention to provide a tool to adjust a drill in order to maintain the tolerance required to get full life use from the drill.

It is also an object of the present invention to provide an adjusting tool for a core drill that is simple, effective and foolproof in providing the function for which it is constructed.

A further object of the invention is to provide an adjusting tool which permits a craftsman with limiting training to maintain the required tolerance of a core drill throughout the useable life of the drill.

Briefly, the invention contemplates a base plate of a convenient size and thickness formed of a desired material sufficient to accomplish the purposes stated. A test recess, or opening is formed on the base plate to permit checking the drill for correctness of diameter. A cone-shaped protrusion is formed on the base plate and extends from its larger end and is of sufficient size to permit a hollow core drill end to be positioned thereover so that by applying a force to the opposite end of the drill, the drill is urged downwardly over the cone surface to spread its cutting edges an amount indicated by the test opening.

DETAILED DESCRIPTION

Figure 1:
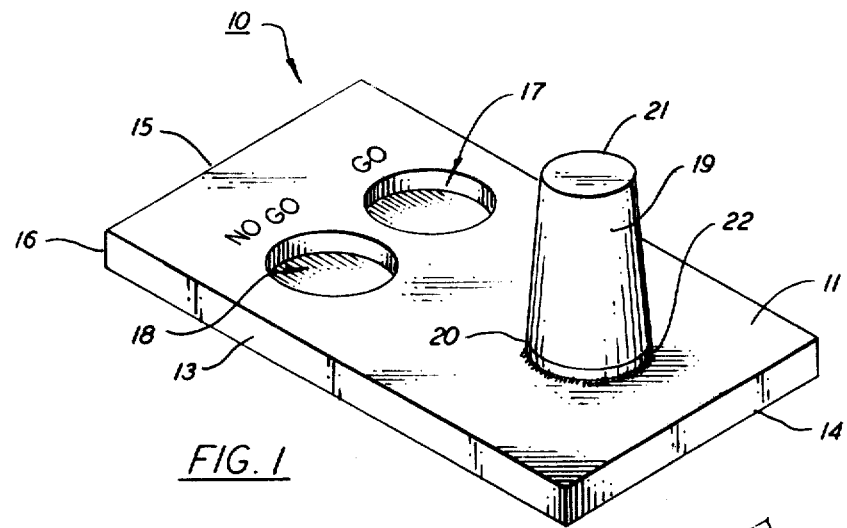
FIG. 1 is a perspective view of the adjusting tool in accordance with the invention.

The same, or similar, parts are identified in the respective figures of the drawings by the same reference numerals.

Reference first to FIG. 1 of the drawings, the numeral 10 identified the adjusting tool constructed in accordance with the invention. A base plate is fabricated from cold rolled steel and is five inches by eight inches by one-half inch dimensions. The base plate 11 is formed of sides 12 and 13 which are each respectively 8 inches long and the ends 14 and 15 each respectively 5 inches long. The thickness of the base plate 11 is indicated by the reference numeral 16 and is $\frac{1}{2}$ inch.

There are two circular recesses, or holes, 17 and 18, respectively, formed in the base plate 11, the center lines of which are located 2.70" from the end 15 of the base plate 11, and the hole 17 is located 1.250" from the side 12; the hole 18 being 1.250" from the side 13, which makes the distance between the center lines of the two holes 17 and 18 2.500". Each of these holes 17 and 18 is 0.375" deep.

The hole 17 has a legend "GO" which is affixed within the surface of the base plate 11, and the hole 18 has a legend "NO GO" within the surface of the base plate 11 immediatedly adjacent the hole 18. The "GO" hole 17 has a diameter equal to $1.420''\ {}^{+0}_{-.002}$", and the "NO GO" hole 18 has a diameter equal to $1.401''\ {}^{+0}_{-.022}$".

This form of "GO" and "NO GO" holes or recesses 17 and 18, respectively, form a very effective "test means" for an inexperienced workman.

A spreader cone 19 is formed of $1\frac{1}{2}$" round steel rod which is cut 2.50" long between the ends 20 and 21. The end 20, therefore, measures $1\frac{1}{2}$" in diameter from a point on the circumference of the spreader cone 19 which is 0.250" from the end 20, the diameter of 1.500" is tappered continuously down to a diameter at the end 21 which is equal to 1.000".

After the spreader cone 19 is case harden, it is positioned on the base plate 11 over a point which is 1.750" measured from the end 14 and 2.500" from each of the edges 12 and 13. Then, the spreader cone 19 is welded by a 360 degree weld 22 directly to the base plate 11. Thereafter, the entire tool is finished, preferably, with a cadmium plating.

Figure 2:
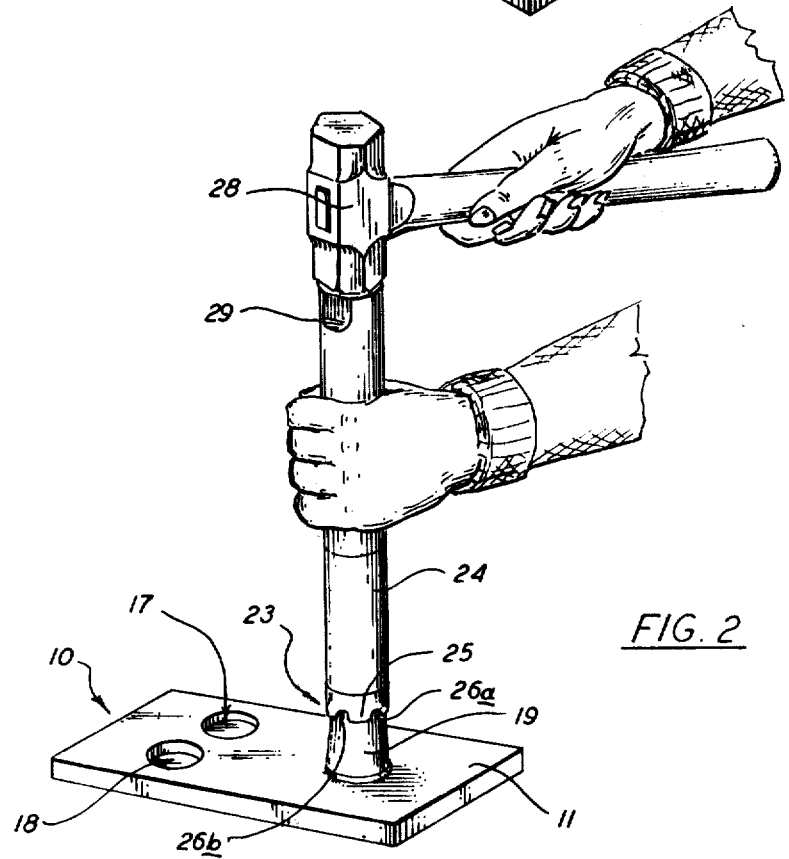
FIG. 2 is a view similar to that in FIG. 1 but showing the adjusting of a core drill in connection with the tool.

Referring now to FIG. 2 of the drawings, the effective use of the adjusting tool 10 of the present invention is illustrated in order to adjust the cutting end 23 of a core drill 24. The cutting edges of the drill 24, one of which is indicated by the reference numeral 25, has a plurality of openings spaced apart circumferentially about the cutting end 23, two of which are illustrated in FIG. 2 by the reference numerals 26a and 26b.

Figure 3:
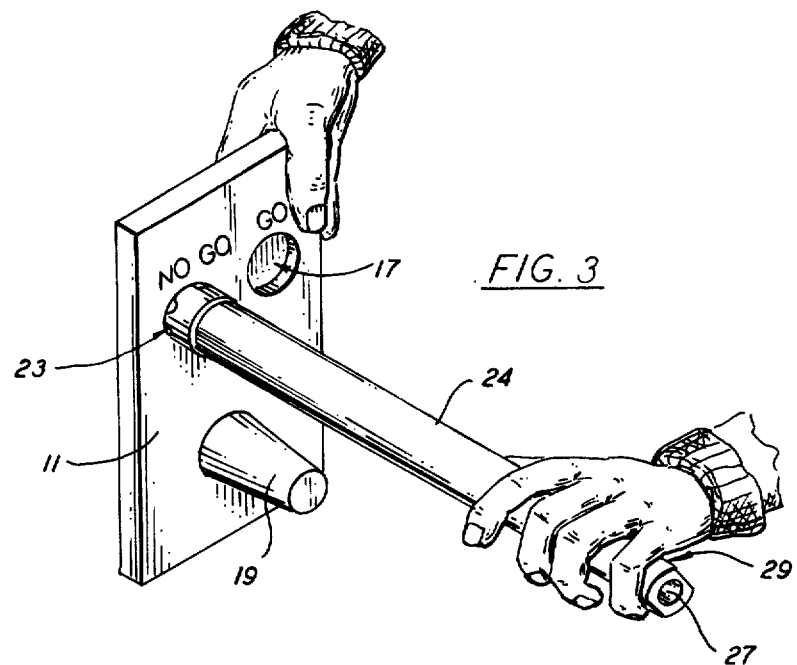
FIG. 3 is a perspective view showing the testing of a core drill in the testing recesses.

Theses openings 26a and 26b communicate with a central bore or channel 27, FIG. 3, for the purpose of permitting ready flow of a fluid to both cool the drill and to lubricate the cutting end 23. The cutting edges 25, which are formed at spaced appart intervals all around the end 23 of the drill 24, are usually formed of industrial diamonds, for example.

Because of the necessity of the openings 26, use of the drill 24 eventually will result in the cutting edges 25 being deformed inwardly toward the central opening 27.

The adjusting tool 10 of the present invention is utilized by placing it horizontally with the spreading cone 19 faced upwardly. Then a core drill 24 which has its cutting end 23 that has become too small through use positioned over the spreading cone 19, and while hand held, the core drill 24 is forced downwardly by any suitable, force applying means, such as a hammer 28.

The cutting end 23 of a drill 24 has its cutting edges 25 deformed inwardly such a small amount that usually it is not perceptible to the eye. Therefore, a suitable testing means is provided also on the base plate 11 by means of the GO and NO GO holes 17 and 18, respectively. Periodically, as after force is applied to the end 29 of the core drill 24 (the end 29 being furthermost from the cutting end 23), the core drill 24 is removed from the spreading cone 19 and the end 23 is tried in the NO GO hole, as illustrated in FIG. 3 of the drawings.

Note particularly that the NO GO hole is smaller in diameter than the GO hole 17, even if by a very small amount. Therefore, as the cutting end 23 of the core drill 24 is adjusted outwardly, it becomes too large to fit within the NO GO hole. Thereafter, it is tested in the GO hole 17 until it just fits or is slightly small enough to enter that hole easily.

Figure 4:
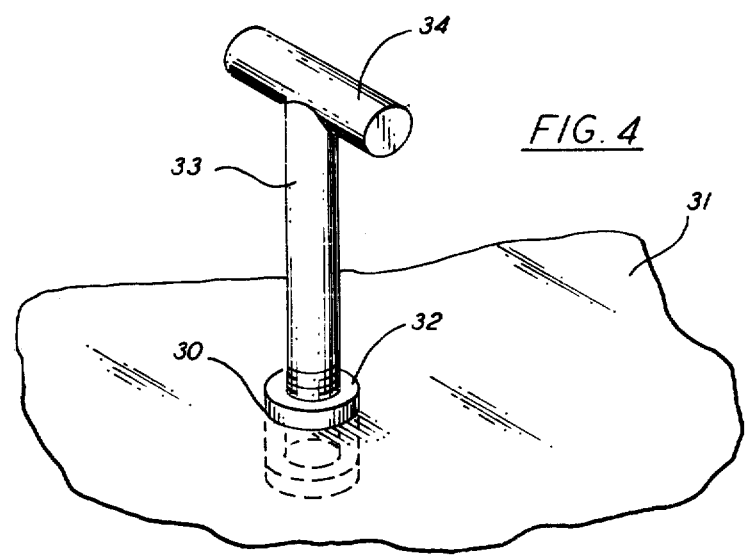
FIG. 4 shows an actual hole that has been drilled in a concrete floor as it is being tested for correct tolerance.

In the simulator field, a hole 30, as viewed in FIG. 4, is drilled into a concrete floor 31 in order to mount a simulator footing securely, as will be described in more detail presently. An additional test is made periodically on each of the holes, similar to the hole 30 in FIG. 4, by inserting a lead anchor 32 in order to observe the closeness of the fit, because such an anchor 32 is inserted into each hole 30 to a predetermined depth in order to be spread by inserting a suitable threaded bolt therein.

It is preferred that an actual lead anchor 32 be used instead of a simulated anchor of the same diameter, and in order to insert such an anchor 32 to the desired depth, a rod 33 is threaded lightly a short distance into the lead anchor 32 in order to lower the lead anchor 32 to a desired depth.

If the drill 24 has become deformed during the drilling of this particular hole 30, the hole will become decreasing in diameter as its depth increases. As a result, the lead anchor 32 would not fit easily beyond a certain depth, which is tested by this arrangement shown in FIG. 4.

If desired, a convenient manner for affecting this particular test, a cross member 34 may be affixed to the rod 33 at a distance determined by the desired depth of the hole 30. Whereupon, if the rod 33 easily drops to the cross member 34, this indicates, of course, that the hole 30 has not decreased in diameter as its depth has increased.

Figure 5:
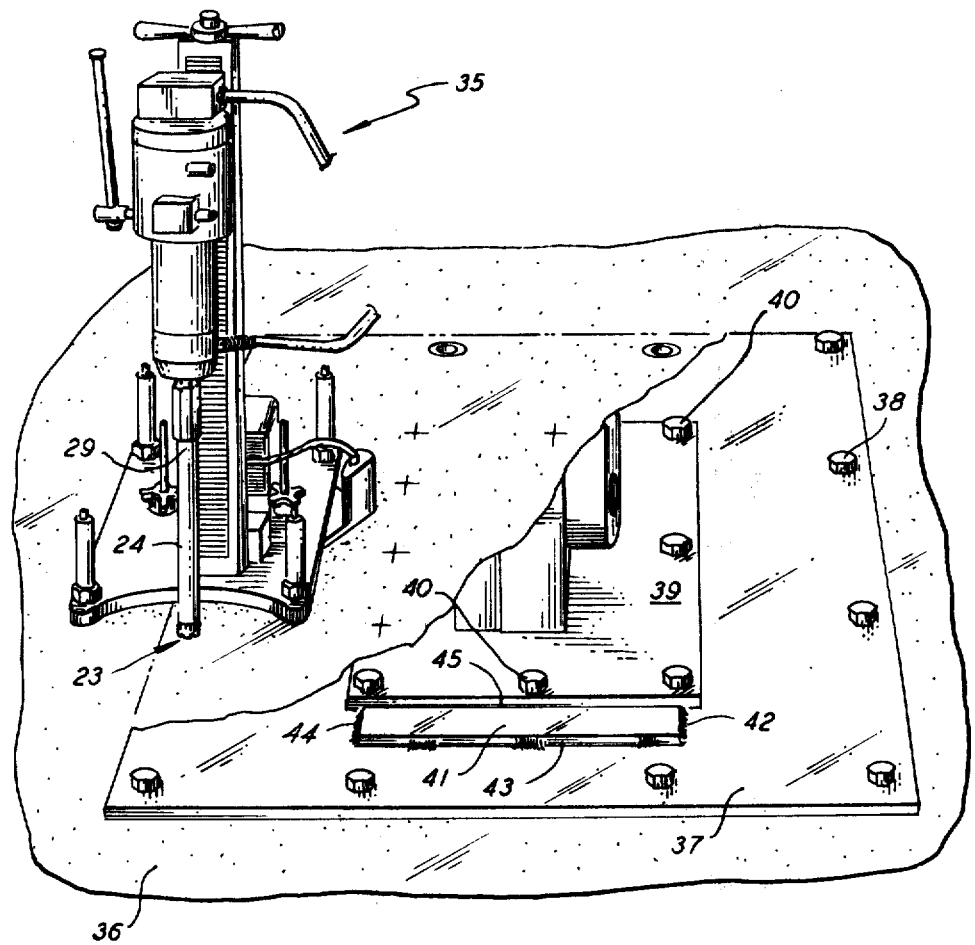
FIG. 5 is a perspective view of a steel plate affixed to a concrete floor by means of drill machinery showing the core drill in actual operation.

In FIG. 5 of the drawings, a drilling machine 35 is illustrated in proper position to use the core drill 24 with its cutting end 23 above a marked point on a concrete floor 36 to drill a hole at this point. A steel plate 37 is cut away to illustrate the drilling position of the machine 35 in order to drill holes such as have been drilled already for a plurality of bolts 38 spaced apart around its periphery at predetermined intervals in order to affix the steel plate 37 firmly to the concrete floor 36.

After the steel plate 37 is affixed in position, a footing 39, also shown in a cutaway condition, illustrates one foot of a simulator structure (not shown) which must be attached firmly and securely in position. A plurality of bolts 40 are illustrated showing the footing 39 of a simulator attached to the steel plate 37, and in this instance, a small steel strip 41 is tack welded around three edges 42, 43 and 44, so that the remaining edge 45 provides a convenient reference surface for proper positioning of the footing 39 in order to match with the location of the bolts 40.

In view of the above detailed description of the presently preferred form of the invention, various modifications, variations and uses will occur to one skilled in this art. Accordingly, the description and the modifications presented hereinabove are to be considered as illustrative only, the true spirit and scope of the invention being that defined by the claims appended hereto.

I claim:

1. A core drill adjusting tool, comprising:
a base plate of a predetermined size and thickness and formed of a preselected material,
test means on said base plate to provide an indication of the correct diameter of said core drill, and
cone means supported by said base plate at its larger end to project therefrom,
so that a core drill, that has become too small in diameter through use, will have its cutting surfaces spread an amount indicated by said test means as correct by applying said cutting surfaces forcefully over said cone means.

2. The drill adjusting tool of claim 1, wherein said predetermined size and thickness of said base plate is in the order of 6" by 8" by ½".

3. The drill adjusting tool of claim 1, wherein said preselected material of which said base plate is formed is steel.

4. The drill adjusting tool of claim 1, wherein said test means on said base plate are in the form of two circular recesses of predetermined diameters into which a core drill is inserted.

5. The drill adjusting tool of claim 2, wherein said preselected material of which baseplate is formed steel, said test means on said base plate are in the form of two circular recesses of predetermined diameters into which a core drill inserted, and said cone means is in the form of a frustum with a predetermined diameter for its smaller end.

* * * * *